United States Patent
Neely

(10) Patent No.: US 7,694,861 B1
(45) Date of Patent: Apr. 13, 2010

(54) TOWING DEVICE

(76) Inventor: Frank T. Neely, 191 Old Mill Creek Rd., Franklin, NC (US) 28734

( * ) Notice: Subject to any disclaimer, the term of this patent is extended or adjusted under 35 U.S.C. 154(b) by 313 days.

(21) Appl. No.: 11/833,395

(22) Filed: Aug. 3, 2007

(51) Int. Cl.
*B60P 3/06* (2006.01)
(52) U.S. Cl. ....................... 224/537; 280/402
(58) Field of Classification Search ........... 224/537; 280/402; 414/463, 466
See application file for complete search history.

(56) References Cited

U.S. PATENT DOCUMENTS

| | | | | |
|---|---|---|---|---|
| 3,428,332 A * | 2/1969 | McCance | .................... | 280/402 |
| 3,430,983 A * | 3/1969 | Jones | .................... | 280/402 |
| 3,776,572 A * | 12/1973 | Bane | .................... | 280/292 |
| 3,979,137 A * | 9/1976 | Lipscomb et al. | ........... | 280/402 |
| 4,763,914 A * | 8/1988 | Lemmons | .................... | 280/401 |
| 5,145,308 A * | 9/1992 | Vaughn et al. | ............... | 414/462 |
| 5,234,307 A * | 8/1993 | Scott | .................... | 414/467 |
| 5,531,560 A * | 7/1996 | Bartholomew | .............. | 414/563 |
| 5,620,197 A * | 4/1997 | Howes | ........................ | 280/402 |
| 5,674,044 A * | 10/1997 | Ranes | .................... | 414/563 |
| 5,938,226 A * | 8/1999 | Transchel | .................. | 280/402 |
| 7,188,856 B2 * | 3/2007 | Maynard | ................... | 280/402 |

* cited by examiner

*Primary Examiner*—Kevin Hurley

(57) ABSTRACT

A towing device. An illustrative embodiment of the towing device includes a hitch bar, a wheel cradle having a generally curved wheel cradle bottom carried by the hitch bar and a pair of spaced-apart wheel cradle sides extending from the wheel cradle bottom and at least one securing strap carried by the wheel cradle.

9 Claims, 4 Drawing Sheets

TOWING DEVICE

FIELD

The present invention relates to devices for towing vehicles. More particularly, the present invention relates to a towing device which can be hitched to a towing vehicle to tow a motorcycle behind the towing vehicle.

BACKGROUND

Under some circumstances it is necessary or desired to tow a motorcycle behind a towing vehicle. This is accomplished typically by hitching a flat-bed towing trailer to the towing vehicle and placing and securing the motorcycle on the towing trailer. If the towing vehicle is a pickup truck, the motorcycle can be secured in the bed of the pickup truck. A towing trailer, however, requires a relatively large volume of storage space. Moreover, securing the motorcycle to the towing trailer can be time-consuming and cumbersome.

SUMMARY

The present invention is generally directed to a towing device. An illustrative embodiment of the towing device includes a hitch bar, a wheel cradle having a generally curved wheel cradle bottom carried by the hitch bar and a pair of spaced-apart wheel cradle sides extending from the wheel cradle bottom and at least one securing strap carried by the wheel cradle.

BRIEF DESCRIPTION OF THE DRAWINGS

The invention will now be described, by way of example, with reference to the accompanying drawings, in which.

DETAILED DESCRIPTION

Figure 1:
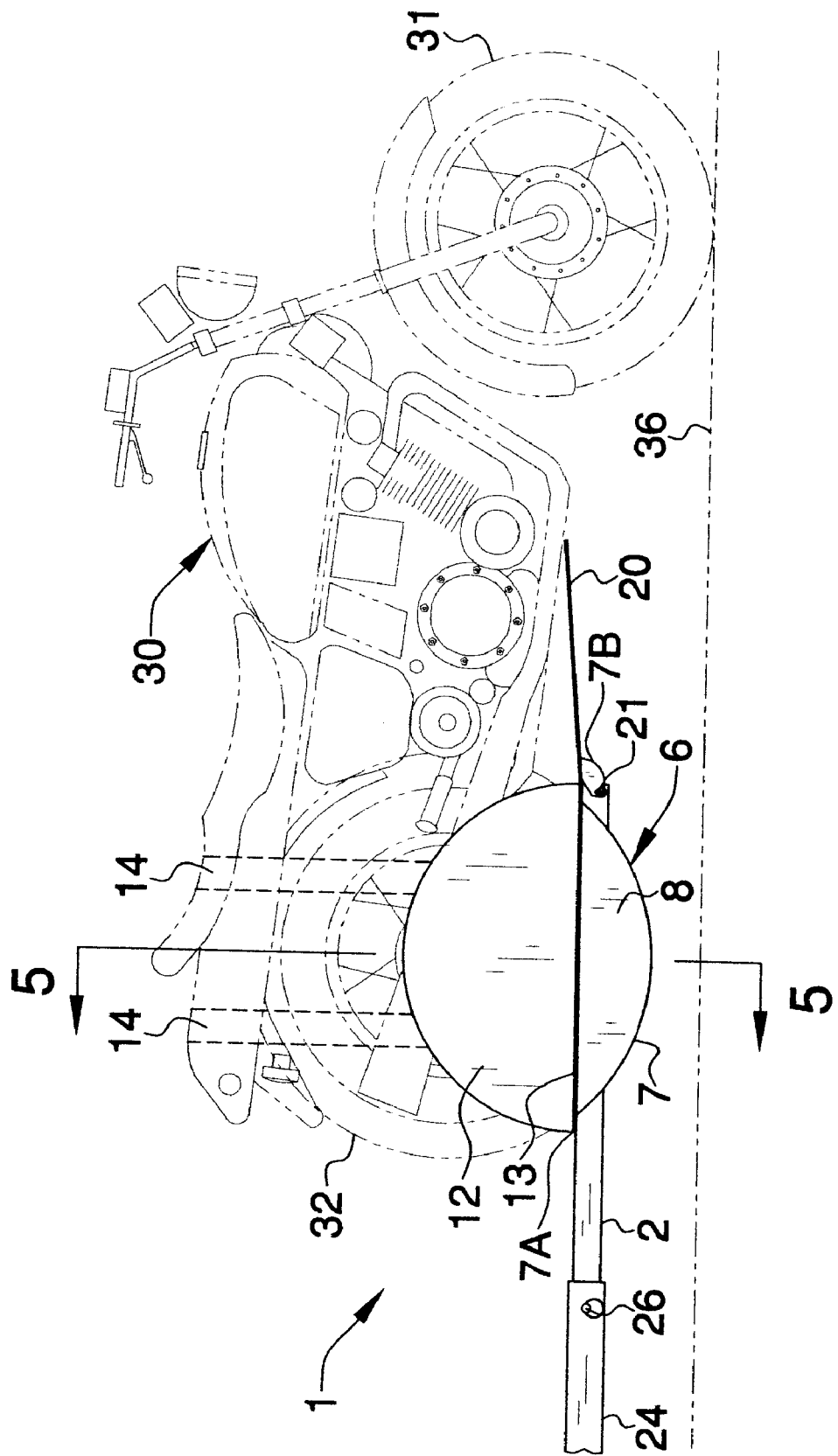
FIG. 1 is a side view of an illustrative embodiment of the towing device, with a rear wheel of a motorcycle secured in the towing device.

Referring to the drawings, an illustrative embodiment of the towing device is generally indicated by reference numeral 1. As will be hereinafter described, the towing device 1 is adapted to be coupled to a receiver hitch 24 (partially in section) which is provided on a towing vehicle (not shown). The towing device 1 secures a rear wheel 32 of a motorcycle 30 in a raised position over a towing surface 36, with a front wheel 31 of the motorcycle 30 resting on the towing surface 36 (FIG. 1) during towing. While description of the towing device 1 is made herein with reference to towing of a motorcycle 30, it will be appreciated and understood by those skilled in the art that the towing device 1 is equally adapted to use for towing a bicycle (not shown) behind a towing vehicle.

Figure 3:
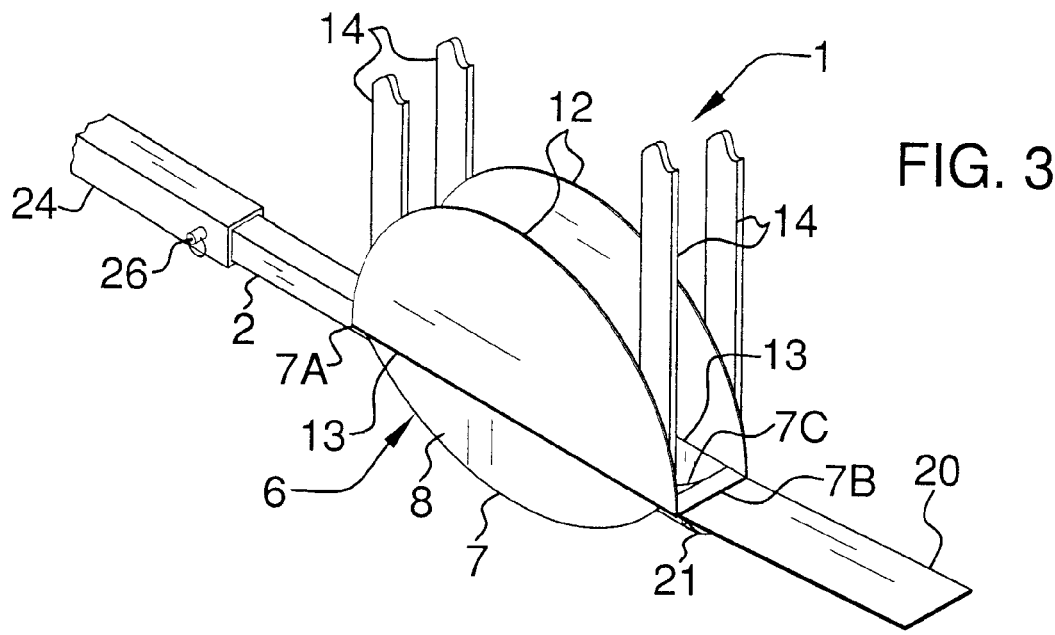
FIG. 3 is a perspective view of an illustrative embodiment of the towing device, coupled to a receiver hitch (partially in section) and shown in a wheel-securing configuration.
Figure 4:
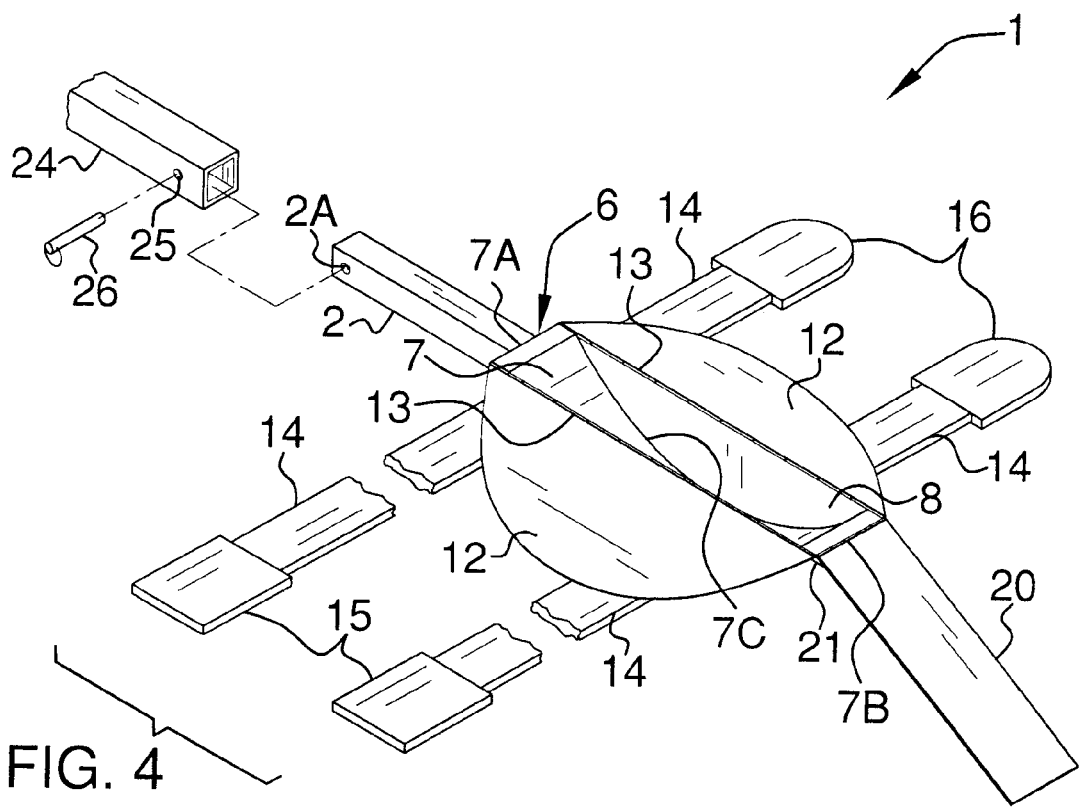
FIG. 4 is a perspective view of an illustrative embodiment of the towing device, uncoupled from a receiver hitch (partially in section) and shown in a wheel-releasing configuration.
Figure 5:
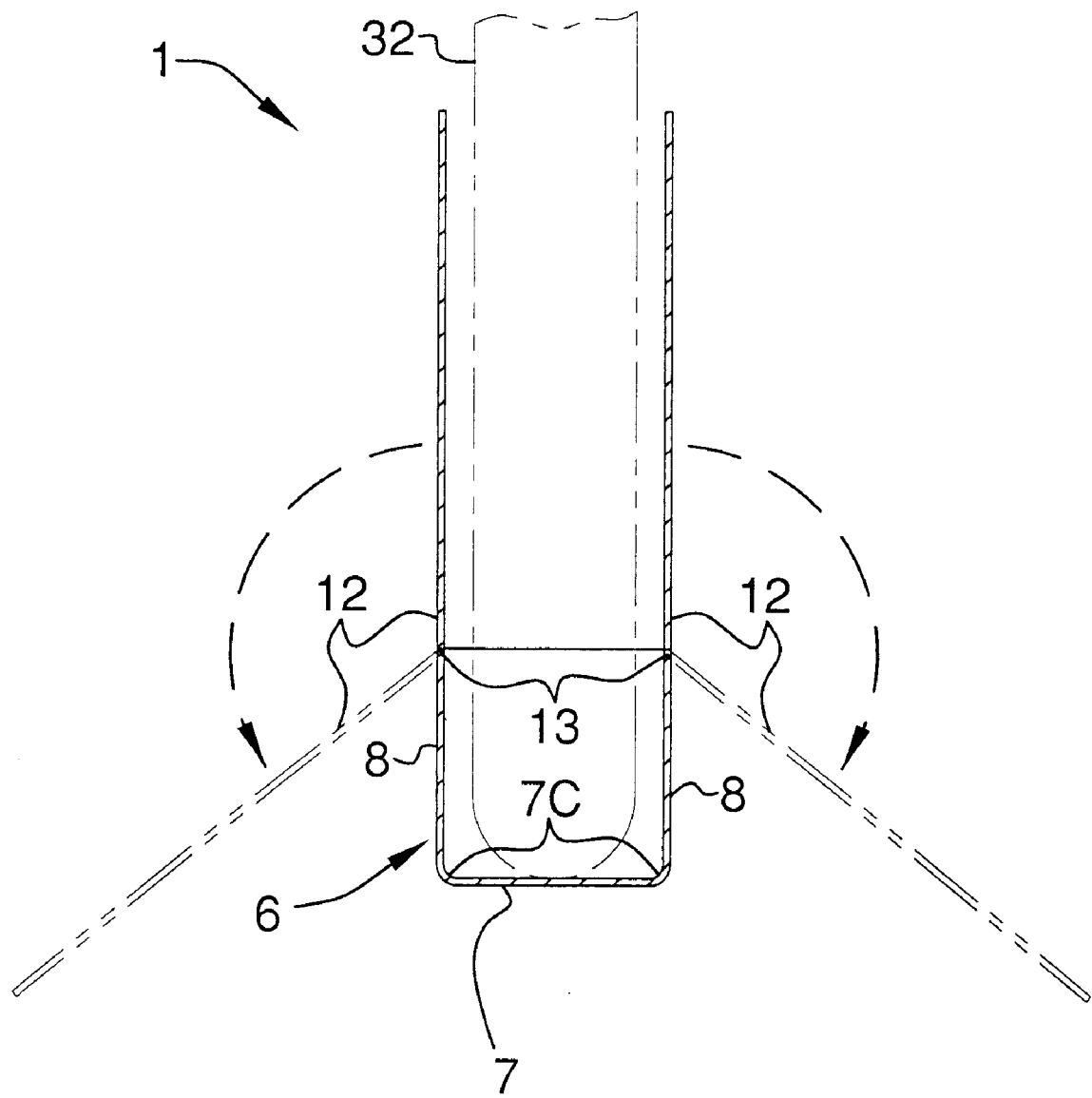
FIG. 5 is a sectional view, taken along section lines 5-5 in FIG. 1.

As shown in FIGS. 3-5, the towing device 1 includes a generally elongated hitch bar 2, which may be square tubing, for example. The hitch bar 2 is adapted to be detachably coupled to the receiver hitch 24 which is provided on the towing vehicle (not shown) according to any suitable technique which is known to those skilled in the art. As shown in FIG. 4, in some embodiments, a lock pin opening 2a is provided in the hitch bar 2. A lock pin opening 25 is provided in the receiver hitch 24. The hitch bar 2 is inserted in the receiver hitch 24 until the lock pin opening 2a in the hitch bar 2 registers with the lock pin opening 25 in the receiver hitch 24. A lock pin 26 is extended through the registering lock pin openings 2a, 25 to couple the towing device 1 to the receiver hitch 24.

A wheel cradle 6 is provided on the hitch bar 2. The wheel cradle 6 includes a generally elongated, curved or concave wheel cradle bottom 7. The cradle bottom 7 typically has a towing end 7a; a loading end 7b; and generally parallel, spaced-apart side edges 7c extending between the towing end 7a and the loading end 7b. The hitch bar 2 typically extends from the towing end 7a of the wheel cradle bottom 7. A pair of generally parallel, spaced-apart wheel cradle sides 8 extends from the respective side edges 7c of the wheel cradle 6. Each wheel cradle side 8 has a generally semicircular configuration.

In some embodiments, a pair of cradle extension panels is selectively extendable from the respective wheel cradle sides 8 of the wheel cradle 6. Each cradle extension panel 12 typically has a generally semicircular configuration. A panel hinge 13 pivotally attaches each cradle extension panel 12 to the corresponding wheel cradle side 8 of the wheel cradle 6.

A wheel securing mechanism is provided on the wheel cradle 6 or the cradle extension panels 12 to secure the rear wheel 32 of the motorcycle 30 in the wheel cradle 6. In some embodiments, the wheel securing mechanism includes at least one securing strap 14 which extends from each wheel cradle side 8 of the wheel cradle 6 or alternatively, from each cradle extension panel 12, as shown. As shown in FIG. 4, a lock buckle 15 is provided on the securing strap 14 of one cradle extension panel 12. A lock buckle insert 16 is provided on the securing strap of the other cradle extension panel 12 for detachable insertion in the lock buckle 15.

Figure 2:
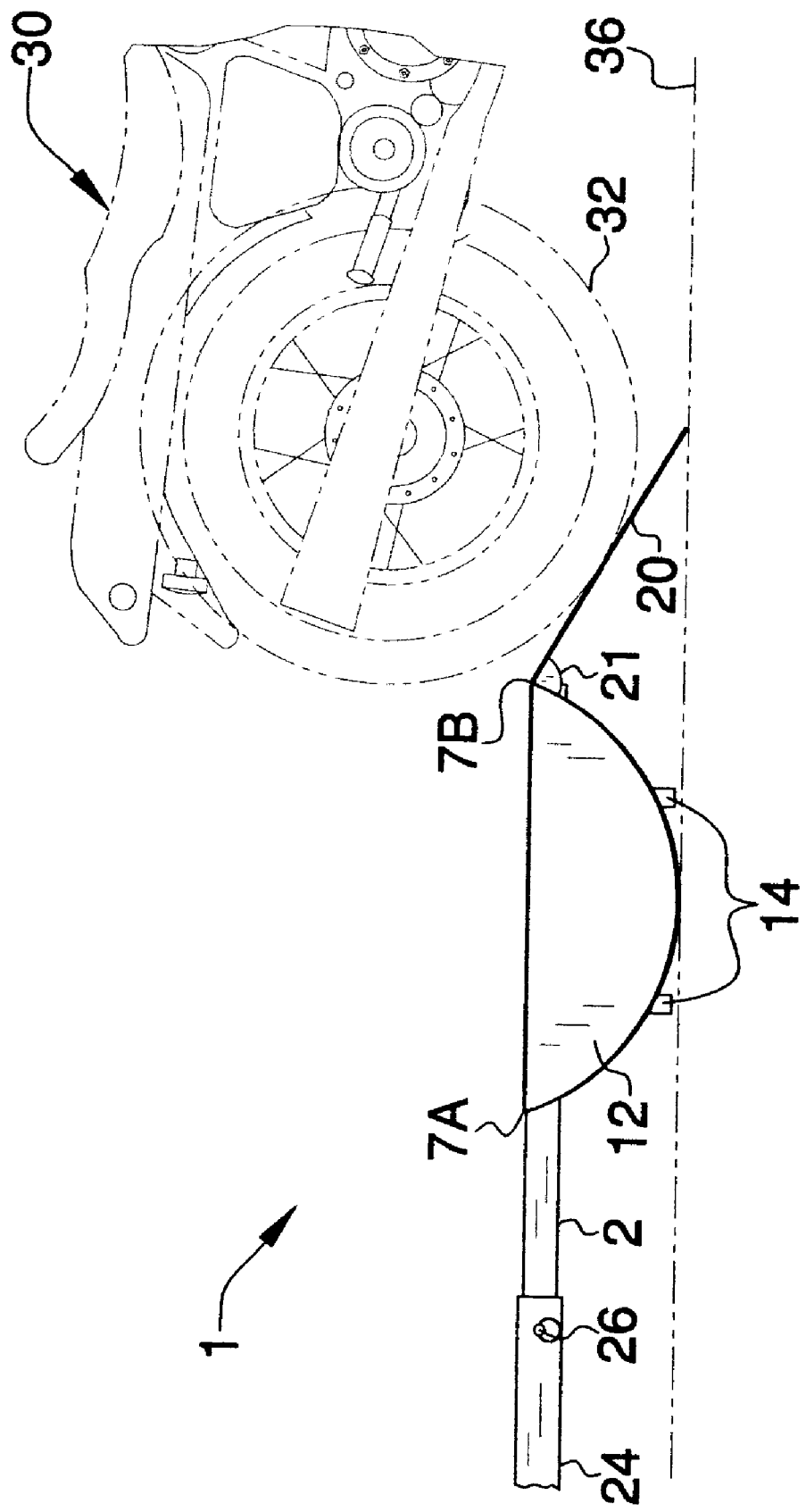
FIG. 2 is a side view of an illustrative embodiment of the towing device, more particularly illustrating loading and unloading of a rear wheel of a motorcycle (in phantom) with respect to the towing device.

In some embodiments, a ramp panel 20 extends from the wheel cradle 6. The ramp panel 20 may be pivotally attached to the wheel cradle 6 at a ramp panel hinge 21 which is provided typically at the loading end 7b of the wheel cradle bottom 7 of the wheel cradle 6. Accordingly, the ramp panel 20 is selectively positional in a lowered, functional configuration in which the ramp panel 20 rests on the towing surface 36, as shown in FIG. 2. The lowered, functional configuration of the ramp panel 20 facilitates placement of the rear wheel 32 of the motorcycle 30 in the wheel cradle 6, as shown in FIG. 2. The ramp panel 20 can alternatively be placed in a raised, non-functional configuration shown in FIGS. 1 and 3 for towing of the motorcycle 30. The ramp panel 20 can be secured in the raised, non-functional configuration using any suitable technique which is known to those skilled in the art.

In typical use, the towing device 1 is coupled to the receiver hitch 24 of the towing vehicle (not shown) typically as was heretofore described. With the cradle extension panels 12 and the ramp panel 20 disposed in the lowered, functional configuration shown in FIGS. 2 and 4, the rear wheel 32 of the motorcycle 30 is backed over the ramp panel 20 and into the wheel cradle 6, as shown in FIG. 2. The cradle extension panels 12 are then pivoted along the respective panel hinges 13 to the raised position shown in FIGS. 1 and 3 and the solid lines in FIG. 5. The securing straps 14 are extended around the rear portion of the motorcycle 30, as shown in FIG. 1, and fastened to secure the cradle extension panels 12 in the raised position. The ramp panel 20 is raised from the lowered, functional configuration to the raised, non-functional configuration shown in FIGS. 1 and 3. Accordingly, as shown in FIG. 1, the towing device 1 maintains the rear wheel 32 of the motorcycle 30 in a raised position over the towing surface 36 whereas the front wheel 31 of the motorcycle 30 rolls freely on and along the towing surface 36. Upon arrival at the desired destination, the rear wheel 32 of the motorcycle 30 is removed from the towing device 1 typically by reversing the steps which were heretofore described.

While the preferred embodiments of the invention have been described above, it will be recognized and understood that various modifications can be made in the invention and the appended claims are intended to cover all such modifications which may fall within the spirit and scope of the invention.

What is claimed is:

1. A towing device, comprising:
   a hitch bar;
   a wheel cradle having a generally curved wheel cradle bottom carried by said hitch bar and a pair of spaced-apart wheel cradle sides extending from said wheel cradle bottom;
   at least one securing strap carried by said wheel cradle; and
   a pair of cradle extension panels pivotally carried by said pair of spaced-apart wheel cradle sides, respectively, and wherein said at least one securing strap extends from said pair of cradle extension panels.

2. The towing device of claim 1 wherein said hitch bar comprises square tubing.

3. The towing device of claim 1 further comprising a lock pin opening provided in said hitch bar.

4. The towing device of claim 1 wherein each of said pair of spaced-apart wheel cradle sides is generally semicircular.

5. The towing device of claim 1 wherein each of said pair of cradle extension panels is generally semicircular.

6. The towing device of claim 1 further comprising a ramp panel extending from said wheel cradle.

7. The towing device of claim 6 wherein said ramp panel is pivotally carried by said wheel cradle.

8. A towing device, comprising:
   a wheel cradle including a generally elongated and curved wheel cradle bottom having a towing end, a loading end spaced-apart from said towing end, a pair of side edges extending between said towing end and said loading end and a pair of spaced-apart wheel cradle sides extending from said pair of side edges, respectively, of said wheel cradle bottom;
   a pair of cradle extension panels pivotally carried by said pair of wheel cradle sides, respectively, of said wheel cradle;
   at least one securing strap extending from said pair of cradle extension panels;
   a hitch bar extending from said towing end of said wheel cradle bottom; and
   a ramp panel extending from said loading end of said wheel cradle bottom.

9. The towing device of claim 8 wherein said ramp panel is pivotally carried by said loading end of said wheel cradle bottom.

* * * * *